(12) United States Patent
Kitada et al.

(10) Patent No.: US 7,729,846 B2
(45) Date of Patent: Jun. 1, 2010

(54) CONTROL DEVICE FOR ENGINE

(75) Inventors: Junya Kitada, Irvine City, CA (US); Shigetoshi Hirano, Toyoake (JP); Koji Kawakita, Ohbu (JP); Hitoshi Kamura, Okazaki (JP); Katsuhiro Furuta, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/561,883

(22) Filed: Sep. 17, 2009

(65) Prior Publication Data

US 2010/0065031 A1    Mar. 18, 2010

(30) Foreign Application Priority Data

Sep. 18, 2008  (JP)  ............................ P2008-239990

(51) Int. Cl.
*F02D 41/22*  (2006.01)
*F02D 41/14*  (2006.01)

(52) U.S. Cl. ........................ 701/107; 123/690; 123/479; 123/1 A (58) Field of Classification Search ................. 701/109; 123/1 A, 431, 479, 575–577, 690
See application file for complete search history.

(56) References Cited

U.S. PATENT DOCUMENTS

| | | | | |
|---|---|---|---|---|
| 4,989,570 A | * | 2/1991 | Kuribara et al. | ............. 123/494 |
| 5,007,398 A | * | 4/1991 | Kashiwabara | ................ 123/479 |
| 5,282,451 A | * | 2/1994 | Yoshida et al. | ......... 123/406.15 |
| 5,400,762 A | * | 3/1995 | Fodale et al. | ................. 123/674 |
| 5,947,089 A | * | 9/1999 | Joyce et al. | ................... 123/479 |
| 6,343,571 B1 | * | 2/2002 | Rockwell et al. | ........... 123/25 C |
| 2008/0115768 A1 | * | 5/2008 | Carr et al. | .................... 123/479 |
| 2008/0312810 A1 | * | 12/2008 | Nonoyama | ................... 701/111 |

FOREIGN PATENT DOCUMENTS

JP          2956237 B2     10/1999

\* cited by examiner

*Primary Examiner*—Erick Solis
(74) *Attorney, Agent, or Firm*—Birch, Stewart, Kolasch & Birch, LLP (57) ABSTRACT

A control device for an engine includes an air-fuel ratio detector detecting an air-fuel ratio of an exhaust gas of the engine. A feedback controller performs a feedback control of an amount of a fuel injection of mixed fuel including alcohol so that the air-fuel ratio detected by the air-fuel ratio detector is come close to a target air-fuel ratio, the mixed fuel supplied from a fuel feeder. A concentration estimator estimates a concentration of the alcohol in the mixed fuel based on the air-fuel ratio of the exhaust gas and a correction amount for the amount of the fuel injection controlled by the feedback control. A malfunction determiner determines that the fuel feeder has a malfunction when the correction amount is greater than or equal to a value for a period which is longer than a first period in a second period. The second period is from a first time point when the feedback controller starts to perform the feedback control.

10 Claims, 5 Drawing Sheets

CONTROL DEVICE FOR ENGINE

BACKGROUND

The present invention relates to a control device for an engine capable of using fuel into which alcohol is mixed.

Although an engine for a vehicle such as an automobile generally uses gasoline as a fuel, an engine which can use fuel into which alcohol is mixed is also well-known. A vehicle which mounts an engine capable of using fuel into which alcohol is mixed at an arbitrary mixing ratio is generally referred to as a FFV (Flexible Fuel Vehicle).

An engine for such an FFV is also, in the same manner as the gasoline engine, subject to a control where an exhaust air/fuel ratio is detected based on oxygen concentration in an exhaust gas using an oxygen sensor or an LAFS (linear air/fuel ratio sensor), and a fuel feed quantity is feedback-controlled such that the exhaust air/fuel ratio approximates a target air/fuel ratio.

Here, in the FFV, it is necessary to properly perform a control of fuel injection quantity by taking the difference in properties of both fuels such as the difference in theoretical air/fuel ratio between gasoline and alcohol into consideration. That is, it is necessary to properly grasp alcohol concentration of fuel into which alcohol is mixed and to perform a proper fuel-feed quantity control corresponding to the alcohol concentration. Here, to properly grasp the alcohol concentration, it is necessary to suitably learn alcohol concentration corresponding to a state where alcohol concentration is changeable as in the case of feeding fuel into a vehicle.

There has been known an internal combustion engine which detects properties of fuel based on a displacement amount between a basic fuel injection time which is set corresponding to a running state and an actual fuel injection time (for example, Patent Document 1).

On the other hand, there has been also proposed a technique which detects a malfunction of a fuel feeding system represented by clogging of a fuel injection valve or the like based on a change of a correction amount of a feedback control. In this case, a state where an exhaust air/fuel ratio is continuously maintained in a lean state in spite of a control of a correction amount so as to allow the exhaust air/fuel ratio to have a stoichiometric amount of air is determined as the occurrence of clogging of a fuel injection valve.

[Patent document 1] Japanese Patent No. 2956237

However, in the state of the art, it is difficult to accurately distinguish whether a change of correction amount in the feedback control is brought about by an actual change in alcohol concentration due to feeding of fuel or the like or by the displacement between a basic fuel injection quantity and an actual fuel injection quantity attributed to an malfunction of a fuel feeding system or the like. Accordingly, there may be a case where the alcohol concentration of mixed fuel cannot be accurately learnt. Since the fuel injection quantity is subject to the feedback control based on the exhaust air/fuel ratio as described above, even when the exhaust air/fuel ratio is changed due to a factor other than a change of alcohol concentration of a mixed fuel, an actual fuel injection quantity is changed. For example, even when a fuel injection quantity is decreased due to the occurrence of clogging in a fuel injection valve, an actual fuel injection quantity is increased and becomes larger than a basic fuel injection quantity.

When alcohol concentration of the mixed fuel is detected based on merely a correction amount of a fuel injection quantity, there exists a possibility that a change of the correction amount attributed to clogging in the fuel injection valve is also erroneously determined as a change of alcohol concentration. When such erroneous determination is made, the alcohol concentration of the mixed fuel cannot be accurately learnt so that there exists a possibility that the air/fuel ratio cannot be properly controlled.

SUMMARY OF THE INVENTION

It is therefore one advantageous aspect of the present invention to provide a control device for an engine which can properly distinguish a change of alcohol concentration and a malfunction of a fuel feeding system thus properly controlling an air/fuel ratio.

According to one aspect of the invention, there is provided a control device for an engine comprising:

an air-fuel ratio detector detecting an air-fuel ratio of an exhaust gas of the engine, the engine capable of using mixed fuel including alcohol;

a feedback controller performing a feedback control of an amount of a fuel injection of mixed fuel including alcohol so that the air-fuel ratio detected by the air-fuel ratio detector is come close to a target air-fuel ratio, the mixed fuel supplied from a fuel feeder;

a concentration estimator estimating a concentration of the alcohol in the mixed fuel based on the air-fuel ratio of the exhaust gas and a correction amount for the amount of the fuel injection controlled by the feedback control; and a malfunction determiner determining that the fuel feeder has a malfunction when the correction amount is greater than or equal to a value for a period which is longer than a first period in a second period, the second period which is from a first time point when the feedback controller starts to perform the feedback control.

The control device may be configured such that: the concentration estimator stops to estimate the concentration of the alcohol of the mixed fuel, when the malfunction determiner determines that the fuel feeder has the malfunction.

The control device may be configured such that: the fuel feeder includes a fuel feeding device which is return-less type; and the second period is from the first time point to a second time point when fuel in a fuel feeding passage provided in the fuel feeding device is replaced with fuel in a tank storing the mixed fuel.

The engine may include: a canister accumulating a vaporizing fuel; and a purge passage connecting the canister to an intake system.

The control device may further comprise: a purge controller controlling injection amount of the vaporizing fuel to be injected into the intake system by controlling an open and close of the purge passage, wherein the purge controller inhibits injecting the vaporizing fuel into the intake system until the second period elapses.

The control device may be configured such that: the fuel feeder includes a fuel feeding device which is return-less type; and the second period is from the first time point to a second time point when the integrated value of the amount of the fuel injection becomes equal to a volume of a fuel feeding passage provided in the fuel feeding device.

DETAILED DESCRIPTION OF EXEMPLIFIED EMBODIMENT

Hereinafter, embodiments of the present invention is explained by exemplifying an engine system which includes an engine which uses mixed fuel into which alcohol is mixed and a control device.

Figure 1:
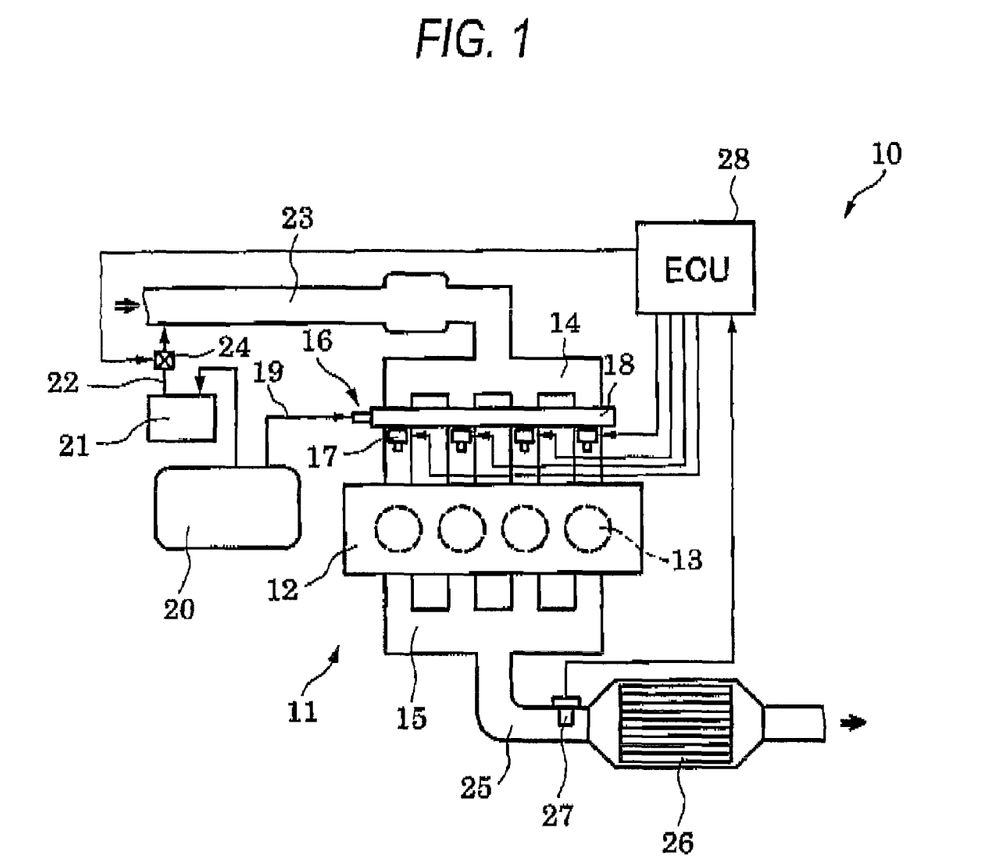
FIG. 1 is a view showing the schematic constitution of an engine system according to a first embodiment of the present invention.

Hereinafter, a first embodiment of the present invention is explained referring to FIGS. 1 to 4. An engine 11 shown in FIG. 1 is a multi-point-injection type multi-cylinder engine, for example, an in-line 4-cylinder engine. Four cylinders 13 are arranged in parallel to each other in an engine body 12. An ignition plug (not shown in the drawing) is arranged in respective combustion chambers 13, and an intake port and an exhaust port (not shown in the drawing) are provided to each combustion chamber 13. An intake manifold 14 is connected to the intake port, and an exhaust manifold 15 is connected to the exhaust port.

Although not shown in the drawing, an intake valve is mounted in each intake port, and an exhaust valve is mounted in each exhaust port. The intake port and the exhaust port are opened and closed by these intake valve and exhaust valve.

The intake manifold 14 includes a fuel feeding device 16 for feeding fuel to the respective cylinders 13. Specifically, a plurality of fuel injection valves 17 corresponding to the respective cylinders 13 is provided to the intake manifold 14. These fuel injection valves 17 are connected to a delivery pipe 18, and the delivery pipe 18 is connected to a fuel tank 20 by way of a fuel pipe 19. That is, the fuel feeding device 16 is configured to feed fuel in the fuel tank 20 to the respective fuel injection valves 17 by way of the delivery pipe 18 and to inject the fuel to the respective cylinders 13 from the respective fuel injection valves 17. Since the fuel feeding device 16 according to this embodiment is a so-called returnless type device, the fuel feeding device 16 is not provided with a return passage through which fuel returns to the fuel tank 20 downstream of the delivery pipe 18.

A canister 21 which absorbs evaporated fuel in the fuel tank 20 is connected to the fuel tank 20. The canister 21 is connected to an intake passage 23 which constitutes an intake system by way of a purge passage 22. When a predetermined purge condition is satisfied, a purge controller opens a purge valve 24 provided to the purge passage 22 so as to introduce the evaporated fuel which is absorbed in the canister 21 into the intake passage 23 from the purge passage 22. Due to such a constitution, it is possible to prevent the discharge of the evaporated fuel into atmosphere.

Further, a three-way catalyst 26 which constitutes an exhaust purifying catalyst is provide to a middle portion of an exhaust passage 25 which is connected to the exhaust manifold 15. An $O_2$ sensor 27 which detects oxygen concentration in an exhaust gas before the exhaust gas passes the catalyst is arranged upstream of the three-way catalyst 26.

An ECU (Electronic Control Unit) 28 includes an input/output device, a memory device (ROM, RAM and the like), a central processing unit, a time counter and the like. The ECU 28 performs a systematic control of the engine 11. Besides the above-mentioned $O_2$ sensor 27, various kinds of sensors such as a throttle position sensor, an air flow sensor and a crank angle sensor are connected to an input side of the ECU 28. Detection information from these sensors is inputted to the ECU 28.

On the other hand, various kinds of output devices described above such as the fuel injection valve 17, the purge valve 24, an ignition coil and a throttle valve are connected to an output side of the ECU 28. From these various kinds of output devices, a fuel injection time, valve open/close timing, ignition timing, throttle opening and the like which are computed by the ECU 28 based on detection information from various kinds of sensors are outputted respectively.

The control device 10 of the present invention is constituted of such an ECU 28 and the above-mentioned various kinds of sensors. Further, the control device 10 controls the fuel injection device 17 based on detection information from various kinds of sensors such that an actual air/fuel ratio becomes a properly-set target air/fuel ratio and a proper quantity of fuel is injected at proper timing. Specifically, an exhaust air/fuel ratio is detected by an air/fuel ratio detector based on output information from the $O_2$ sensor 27, and an injection quantity of fuel from the fuel injection valve 17 is feedback-controlled by a feedback controller so as to allow the exhaust air/fuel ratio to assume a preset target air/fuel ratio (for example, a stoichiometric amount of air). Here, an LAFS (Linear Air/Fuel ratio Sensor) may be provided in place of the $O_2$ sensor 27 and an exhaust air/fuel ratio may be detected by the LAFS.

When mixed fuel is fed to the fuel tank 20, corresponding to alcohol concentration of the fed mixed fuel, alcohol concentration of the mixed fuel in the fuel tank 20 is naturally changed. Further, along with such a change of alcohol concentration of the mixed fuel, a fuel injection quantity necessary for bringing an exhaust air/fuel ratio to a target air/fuel ratio is also changed. For example, when the alcohol concentration of the mixed fuel in the fuel tank 20 is increased, it is necessary to increase a fuel injection quantity from the fuel injection valve 17 along with the increase of the alcohol concentration of the mixed fuel. That is, the feedback controller is configured to, not only in a case where the target air/fuel ratio is changed but also in a case where the alcohol concentration of mixed fuel is changed, properly corrects a fuel injection quantity corresponding to such a change so as to bring an exhaust air/fuel ratio to a target air/fuel ratio.

Further, by making use of such finding that a correction amount of fuel injection quantity (hereinafter referred to as "feedback correction amount") is changed corresponding to the change of alcohol concentration of the mixed fuel, in this embodiment, the alcohol concentration of the mixed fuel is estimated by a concentration estimator based on such a change of feedback correction amount.

Further, the control device 10 of the present invention determines a malfunction of the fuel feeding device based on the change of the feedback correction amount. Specifically, when the engine 11 is started after fuel is fed to the fuel tank 20, a malfunction of the fuel feeding device 16 is determined by a malfunction determiner based on a change of feedback correction amount during a predetermined period counted from starting of a feedback control of fuel injection quantity.

Hereinafter, the malfunction determination of the fuel feeding device is explained in detail.

Figure 2:
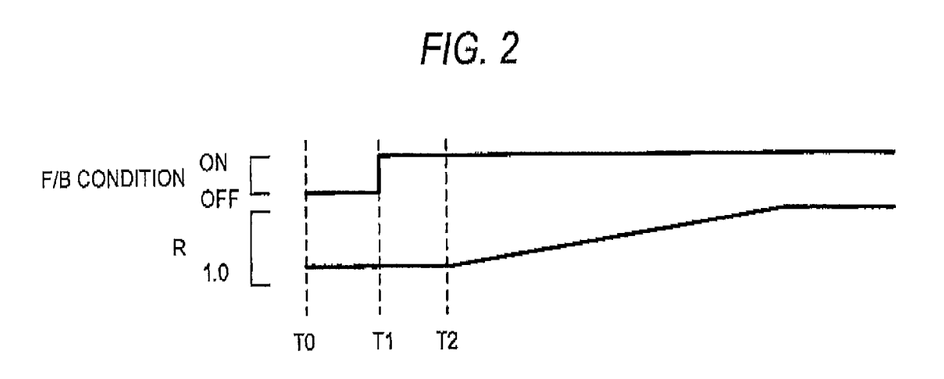
FIG. 2 is a timing chart showing a change of FIB correction amount in a fuel feeding device which is in a normal state.

A timing chart shown in FIG. 2 shows an example where the alcohol concentration of mixed fuel is increased due to feeding of mixed fuel.

When mixed fuel is fed to the fuel tank 20 and the engine is started thereafter, as shown in FIG. 2, during a predetermined period (T0-T1) after starting the engine, a feedback control start condition is not satisfied (F/B condition: OFF) so that a feedback control of the fuel injection quantity is not performed. Various sensors, the catalyst and the like are not activated at cold starting or during idling and hence, in this embodiment, a feedback control is stopped during the predetermined period (T0-T1) after starting the engine and an air/fuel ratio is forcibly shifted to a rich side, for example thus enhancing the starting performance and stability of the engine are enhanced. Accordingly, there is no possibility that a feedback correction amount R is changed during the predetermined period (T0-T1) after starting the engine.

Further, when the predetermined period (T0-T1) elapses and the feedback control start condition is satisfied (F/B condition: ON), the feedback control of fuel injection quantity is started. However, the feedback correction amount R is not immediately changed, and is gradually increased after a lapse of another predetermined period. This is because that fuel remaining in the fuel pipe 19 and the delivery pipe 18 is injected into the respective cylinders 13 immediately after feeding fuel and hence, an exhaust air/fuel ratio is not changed for some time even when the feedback control is started. Then, when the fuel in the delivery pipe 18 is started to be replaced with the fuel in the fuel tank 20, that is, when the predetermined period (T1-T2) elapses after starting the feedback control, the feedback correction amount R is gradually increased to a predetermined amount.

In this manner, in the fuel feeding device in a normal state, there is no possibility that the feedback correction amount R is substantially changed during the predetermined period (T1-T2) after the feedback control of the fuel injection quantity is started.

According to the control device 10 of the present invention, when the feedback correction amount R becomes a predetermined value or more during this predetermined period (T1-T2), the malfunction determiner determines that the fuel feeding device 16 has a malfunction. However, there may be a case where the feedback correction amount R temporarily becomes the predetermined value or more due to disturbances or the like. Accordingly, in the present invention, the control device 10 determines that the fuel feeding device 16 has a malfunction when the feedback correction amount R is continuously held at a predetermined value or more for a fixed period or more thus enhancing the accuracy of the malfunction determination.

Hereinafter, one example of steps of determining the malfunction of the fuel feeding device 16 by the control device 10 according to this embodiment is explained referring to FIGS. 3 and 4.

Figure 3:
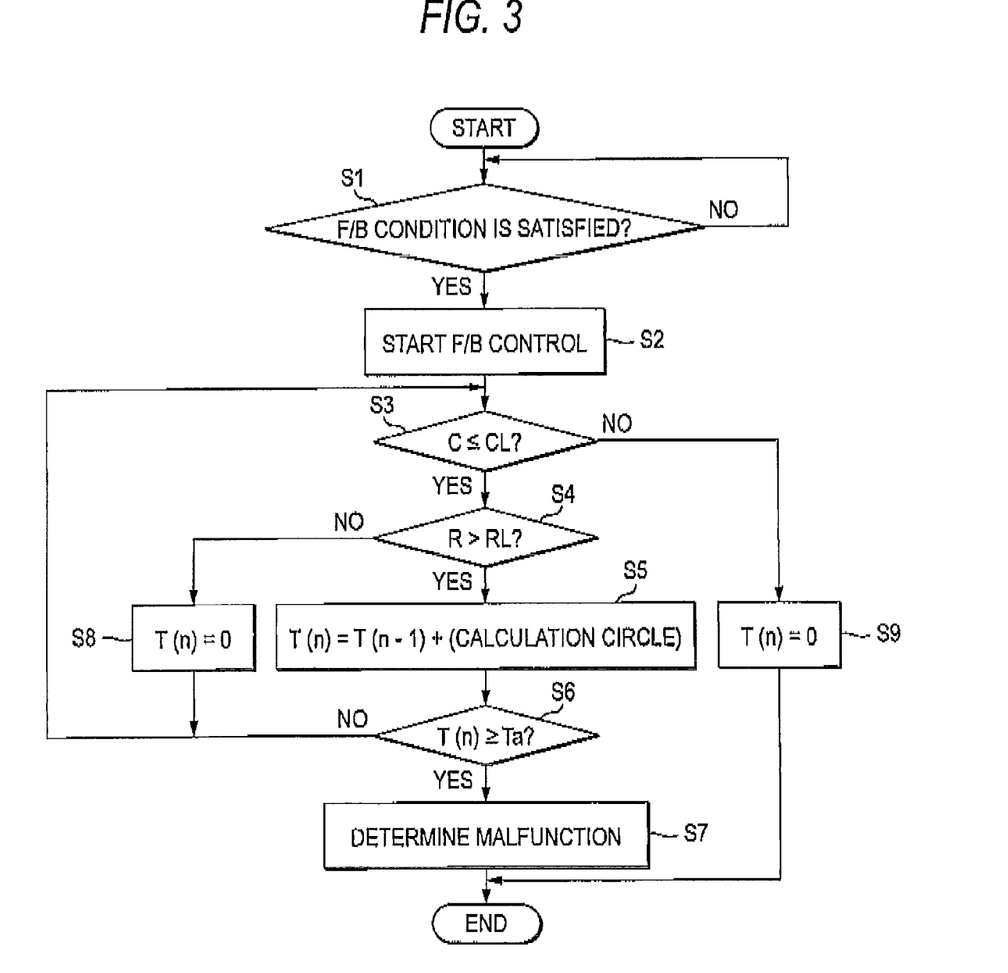
FIG. 3 is a flowchart showing one example of steps of determining a malfunction in the first embodiment.
Figure 4:
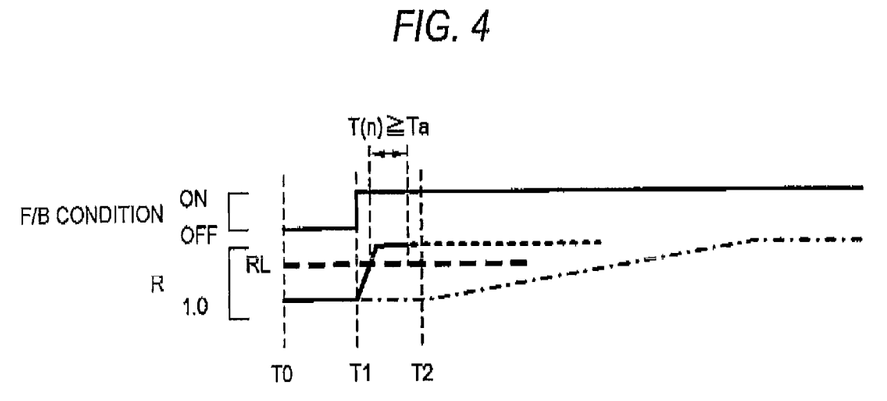
FIG. 4 is a timing chart showing a change of FIB correction amount in a fuel feeding device having malfunction.

When mixed fuel is fed and the engine 11 is started, as shown in FIG. 3, first of all, the control device 10 determines whether or not the feedback control start condition of the fuel injection quantity is satisfied in Step S1. That is, in Step S1, the control device 10 determines whether or not the predetermined period (T0-T1) elapses after starting the engine (see FIG. 4). Although specific start conditions of the feedback control are not particularly limited, it is possible to name the stabilization of engine rotational speed, the activation of various kinds of sensors and the like, for example. Then, when the feedback control start condition is satisfied (Step S1: Yes), the control device 10 starts the feedback control of an injection quantity of fuel from the fuel injection valve 17 (Step S2).

Next, the control device 10 determines whether or not the replacement of fuel in the delivery pipe 18 arranged between the fuel tank 20 and the fuel injection valve 17 with fuel in the fuel tank 20 is started (Step S3). That is, the control device 10 determines whether or not the fuel feeding operation is within the predetermined period (T1-T2) shown in FIG. 4 from starting of the feedback control of the fuel injection quantity.

For example, in this embodiment, the control device 10 determines whether or not an integrated fuel consumption quantity C which is obtained by integrating a quantity of fuel injected from the fuel injection valve 17 is less than or equal to a predetermined value CL. Here, the predetermined value CL corresponds to a volume of the fuel pipe 19 and is approximately 100 cc, for example.

Here, when the integrated fuel consumption quantity C is less than or equal to the predetermined value CL, that is, when the replacement of fuel in the delivery pipe 18 is not started (Step S3: Yes), as a next step, the control device 10 determines whether or not a feedback correction amount R exceeds a predetermined value RL (Step S4). When the feedback correction amount R exceeds the predetermined value RL (Step S4: Yes), the control device 10 calculates an integrated time T(n) which is a period during which the feedback correction amount R exceeds the predetermined value RL (Step S5). The integrated time T(n) is obtained by adding a time required by succeeding calculation processing (calculation cycle) to the previously calculated integrated time T(n−1).

Next, in Step S6, the control device 10 determines whether or not the integrated time T(n) is not less than a predetermined period Ta. That is, the control device 10 determines whether or not a state where the feedback correction amount R exceeds, as indicated by a solid line in FIG. 4, the predetermined value RL is continued for not less than the predetermined period Ta. As indicated by a chained line in FIG. 4, when the fuel feeding device 16 is in a normal state, the feedback correction amount R is not substantially changed during the predetermined period (T1-T2). Accordingly, when the relationship between the integrated time T(n) and the predetermined period Ta assumes T(n)≧Ta during the predetermined period (T1-T2) (Step S6: Yes), the malfunction determiner determines that the fuel feeding device 16 has an malfunction (Step S7) and, thereafter, the malfunction determination processing is finished.

When it is determined that the fuel feeding device 16 has an malfunction, although the malfunction determination is finished in Step S7, the control device 10 alarms a driver by turning on an alarm lamp or the like, for example, thereafter.

At this point of time, it is also preferable to stop the estimation of alcohol concentration of mixed fuel carried out by the concentration estimator. Since alcohol concentration is estimated based on the feedback correction amount R as described above, in a state where the control device 10 determines that the fuel feeding device 16 has a malfunction, there exist a possibility that the alcohol concentration is erroneously learnt. With respect to various kinds of output devices which constitute the engine 11, there are some output devices which output information based on the estimated alcohol concentration. Accordingly, when the alcohol concentration is erroneously learnt, for example, the control device 10 cannot properly control an air/fuel ratio so that drivability may be deteriorated or the exhaust gas purifying performance may be lowered.

On the other hand, when the relationship between the integrated time T(n) and the predetermined period Ta assumes T(n)<Ta in Step S6 (Step S6: No), the processing returns to Step S3 and the above mentioned processing is repeated. Here, when the feedback correction amount R is less than or equal to the predetermined value RL in Step S4 (Step S4: No), the integrated time T(n) calculated in Step S5 is reset (Step S8) and, thereafter, the processing returns to Step S3. Further, when the integrated fuel consumption quantity C exceeds the predetermined value CL in Step S3, in the same manner as Step S8, the integrated time T(n) is reset (Step S9) and a series of steps is finished.

As has been explained above, in the control device 10 for the engine 11 according to this embodiment, a change of the feedback correction amount R is detected during the period where the feedback correction amount R is not changed when the fuel feeding device 16 is in a normal state, and an malfunction of the fuel feeding device 16 is determined based on a result of the detection. Accordingly, the control device 10 can accurately determine the malfunction of the fuel feeding device 16. As a result, it is possible to prevent drawbacks such as excessive injection of fuel in advance thus favorably suppressing the deterioration of exhaust gas performance and drivability and the like. Further, it is also possible to overcome drawbacks such as misfire of the engine, engine stop attributed to the malfunction of the fuel feeding device 16.

There exists a possibility that the feedback correction amount R is temporarily largely displaced due to disturbances or the like. To cope with such a possibility, it is preferable to use a value which is subject to a primary filter in the determination executed in Step S3. Due to such processing, the erroneous determination can be suppressed.

Further, in this embodiment, the control device 10 determines whether or not the predetermined period (T0-T1) and the predetermined period (T1-T2) elapse based on the integrated fuel injection quantity. However, the present invention is not limited to such determination. For example, time which elapses after starting the engine is measured by a timer which the ECU 28 includes, for example, and the control device 10 determines whether or not the above mentioned periods elapse based on a result of the measurement.

Figure 5:
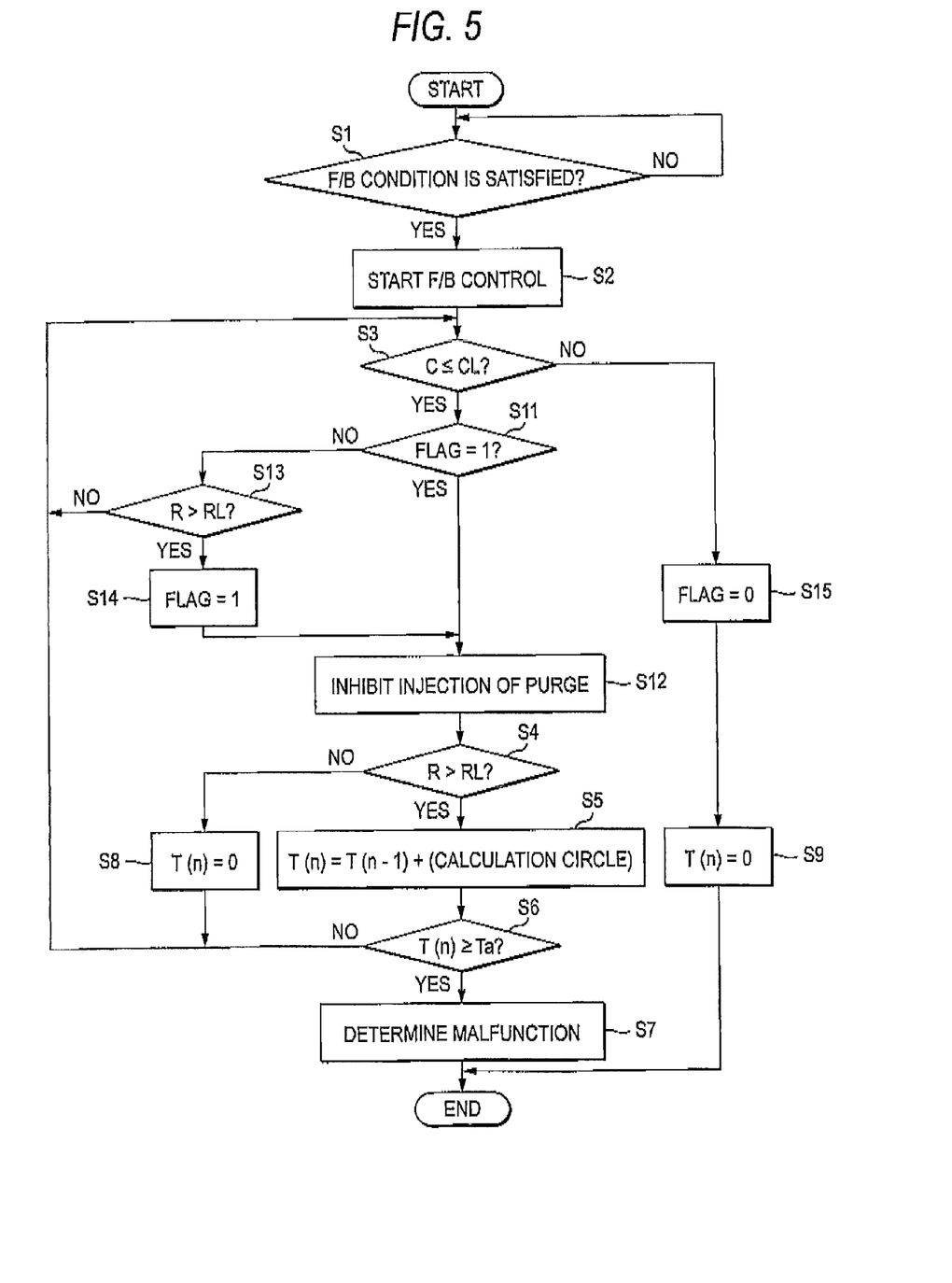
FIG. 5 is a flowchart showing one example of steps of determining a malfunction in a second embodiment.

A second embodiment of the present invention is explained referring to FIG. 5. Same symbols are given to steps of this embodiment identical to the steps of the first embodiment, and their repeated explanation is omitted. Further, the constitution of the engine system of this embodiment is substantially equal to the corresponding constitution of the engine system of the first embodiment and hence, the repeated explanation of the constitution of the engine system is omitted.

This embodiment is directed to an example where the introduction of purge is inhibited at the time of performing the malfunction determination of the fuel feeding device. Specifically, as shown in FIG. 5, when the relationship between the integrated fuel consumption quantity C and the predetermined value CL assumes C≦CL in Step S3 (Step S3: Yes), as a next step, the control device 10 determines whether or not a flag which inhibits the introduction of purge is set, that is, whether the flag is "Flag=1" or "Flag=0" (Step S11). Here, when the flag is set (Step S11: Yes), the introduction of purge is inhibited in a next step (Step S12). That is, when the purge valve 24 is open, the purge valve 24 is closed so as to inhibit the introduction of purge. Thereafter, the processing advances to Step S4.

On the other hand, when the flag is not set in Step S11 (Step S11: No), subsequently, in the same manner as Step S4, the control device 10 determines whether or not the feedback correction amount R exceeds the predetermined value RL (Step S13). In this Step S13, the control device 10 determines whether or not there exists a possibility that the fuel feeding device 16 has a malfunction. Here, when the relationship between the feedback correction amount R and the predetermined value RL assume R>RL (Step S13: Yes), the control device determines that there exists a possibility that the fuel feeding device 16 has an malfunction, and sets a flag which inhibits the introduction of purge in Step S14 ("Flag=1"), and the processing advances to Step S12 thereafter.

When a feedback correction amount R and the predetermined value RL satisfy the relationship R≦RL (Step S13: No), the control device 10 determines that there is no possibility that the fuel feeding device 16 has a malfunction, and the processing returns to Step S3. When the integrated fuel consumption quantity C exceeds the predetermined value CL in Step S3, the flag is reset in Step S15 ("Flag=0"), and the processing advances to Step S9 thereafter.

In this manner, according to this embodiment, when there exists the possibility that the fuel feeding device 16 has a malfunction, the introduction of purge is inhibited for a fixed period and hence, it is possible to determine a malfunction of the fuel feeding device 16 more accurately. That is, when the purge is introduced into the intake pipe 23, there exists a possibility that irregularities occur in the feedback correction amount R along with the introduction of the purge. However, by inhibiting the introduction of purge in the above-mentioned manner, it is possible to prevent the irregularities in the feedback correction amount R attributed to such disturbances and hence, a malfunction of the fuel feeding device 16 can be determined more accurately.

Although the embodiments of the present invention have been explained heretofore, the present invention is not limited to these embodiments. For example, in the above-mentioned embodiments, the present invention has been explained by exemplifying a returnless-type engine. However, it is needless to say that the present invention is also applicable to a control device for a return-type engine having a return passage between a delivery pipe and a fuel tank. Further, for example, in the above-mentioned embodiments, the present invention has been explained by exemplifying an intake-injection-type engine. However, it is needless to say that the present invention is also applicable to a control device for an engine of other type such as cylinder injection type, for example.

What is claimed is:

1. A control device for an engine comprising:
   an air-fuel ratio detector detecting an air-fuel ratio of an exhaust gas of the engine, the engine capable of using mixed fuel including alcohol;
   a feedback controller performing a feedback control of an amount of a fuel injection of mixed fuel including alcohol so that the air-fuel ratio detected by the air-fuel ratio detector is come close to a target air-fuel ratio, the mixed fuel supplied from a fuel feeder;
   a concentration estimator estimating a concentration of the alcohol in the mixed fuel based on the air-fuel ratio of the exhaust gas and a correction amount for the amount of the fuel injection controlled by the feedback control; and
   a malfunction determiner determining that the fuel feeder has a malfunction when the correction amount is greater than or equal to a value for a period which is longer than a first period in a second period, the second period which is from a first time point when the feedback controller starts to perform the feedback control.

2. The control device as set forth in claim 1, wherein:
   the concentration estimator stops to estimate the concentration of the alcohol of the mixed fuel, when the malfunction determiner determines that the fuel feeder has the malfunction.

3. The control device as set forth in claim 2, wherein:
   the fuel feeder includes a fuel feeding device which is return-less type; and
   the second period is from the first time point to a second time point when fuel in a fuel feeding passage provided in the fuel feeding device is replaced with fuel in a tank storing the mixed fuel.

4. The control device as set forth in claim 3, wherein the engine includes: a canister accumulating a vaporizing fuel;

and a purge passage connecting the canister to an intake system, the control device further comprising:
  a purge controller controlling injection amount of the vaporizing fuel to be injected into the intake system by controlling an open and close of the purge passage,
  wherein the purge controller inhibits injecting the vaporizing fuel into the intake system until the second period elapses.

5. The control device as set forth in claim 2, wherein the engine includes: a canister accumulating a vaporizing fuel; and a purge passage connecting the canister to an intake system, the control device further comprising:
  a purge controller controlling injection amount of the vaporizing fuel to be injected into the intake system by controlling an open and close of the purge passage,
  wherein the purge controller inhibits injecting the vaporizing fuel into the intake system until the second period elapses.

6. The control device as set forth in claim 2, wherein:
  the fuel feeder includes a fuel feeding device which is return-less type; and
  the second period is from the first time point to a second time point when the integrated value of the amount of the fuel injection becomes equal to a volume of a fuel feeding passage provided in the fuel feeding device.

7. The control device as set forth in claim 1, wherein:
  the fuel feeder includes a fuel feeding device which is return-less type; and
  the second period is from the first time point to a second time point when fuel in a fuel feeding passage provided in the fuel feeding device is replaced with fuel in a tank storing the mixed fuel.

8. The control device set forth in claim 7, wherein the engine includes: a canister accumulating a vaporizing fuel; and a purge passage connecting the canister to an intake system, the control device further comprising:
  a purge controller controlling injection amount of the vaporizing fuel to be injected into the intake system by controlling an open and close of the purge passage,
  wherein the purge controller inhibits injecting the vaporizing fuel into the intake system until the second period elapses.

9. The control device set forth in claim 1, wherein the engine includes: a canister accumulating a vaporizing fuel; and a purge passage connecting the canister to an intake system, the control device further comprising:
  a purge controller controlling injection amount of the vaporizing fuel to be injected into the intake system by controlling an open and close of the purge passage,
  wherein the purge controller inhibits injecting the vaporizing fuel into the intake system until the second period elapses.

10. The control device as set forth in claim 1, wherein:
  the fuel feeder includes a fuel feeding device which is return-less type; and
  the second period is from the first time point to a second time point when the integrated value of the amount of the fuel injection becomes equal to a volume of a fuel feeding passage provided in the fuel feeding device.

* * * * *